Figure 1:
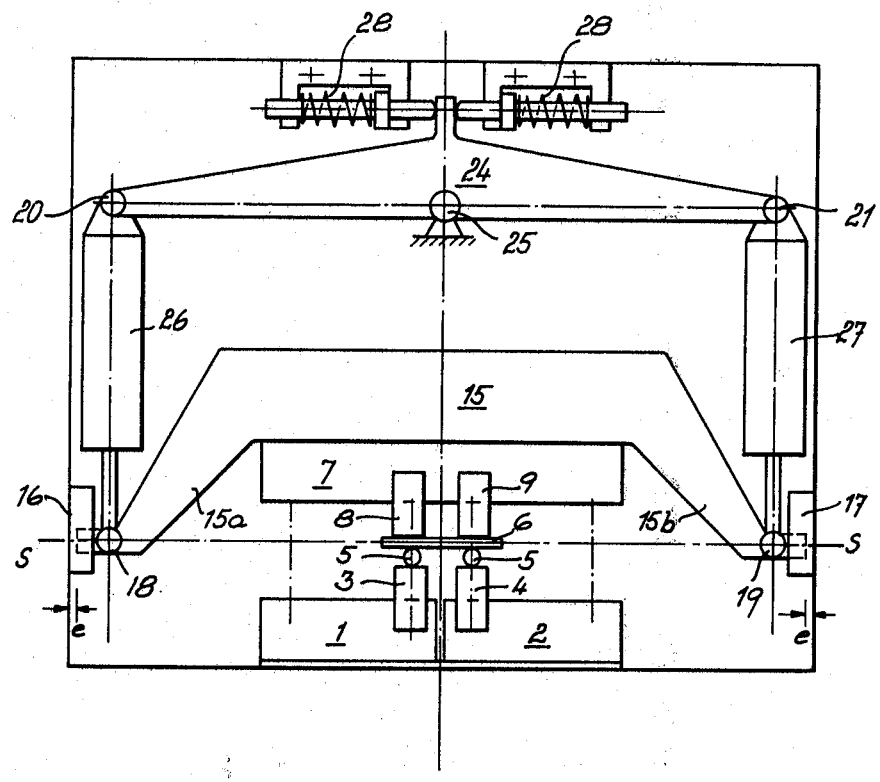

United States Patent [19]

Gött et al.

[11] 4,362,920
[45] Dec. 7, 1982

[54] DOUBLE POINT RESISTANCE WELDING MACHINE

[75] Inventors: Hans Gött; Gerhard Ritter; Klaus Ritter; Josef Ritter, all of Graz, Austria

[73] Assignee: EVG Entwicklungs-u. Verwertungs-Gesellschaft m.b.H., Graz, Austria

[21] Appl. No.: 250,232

[22] Filed: Apr. 2, 1981

[51] Int. Cl.³ .............................................. B23K 11/32
[52] U.S. Cl. ......................................... 219/56; 219/58
[58] Field of Search ..................................... 219/56, 58

[56] References Cited

U.S. PATENT DOCUMENTS 3,188,444  6/1965  Ramstoin ............................. 219/56
4,125,753  11/1978  Rittor ................................. 219/56

Primary Examiner—Elliot A. Goldberg
Attorney, Agent, or Firm—Ernest F. Marmorek

[57] ABSTRACT

A double point welding machine has active electrodes (3,4) and passive counter-electrodes (8,9) for simultaneously welding rods (5,6) together. In order to ensure that the welding pressure is uniform at both welding points, the counter-electrodes (8,9) are mounted on a current bridge (7) carried by a pressure beam (15). The pressure beam forms part of a four bar pivotal linkage the other arms of which are formed by rams (26,27) and a second beam (24) which is pivoted at a pivot (25).

4 Claims, 2 Drawing Figures

DOUBLE POINT RESISTANCE WELDING MACHINE

The invention relates to a double point welding machine, such as a grid welding machine, with a current bridge arrangement having, on one side of a welding plane, at least one pair of active electrodes which are spaced from one another to provide the double point welding interval and are connected to the secondary side of a welding transformer. A pivotally mounted current bridge carries passive counter-electrodes for operative association with the active electrodes whereby welding pressure may be applied to a workpiece in the welding plane between the active electrodes and the passive counter-electrodes. Such a machine is hereinafter referred to as of the kind described.

A machine of this kind is known from Austrian Pat. No. 259,993. In that case, the current bridge is supported on a ram which moves the current bridge in a direction normal to the welding plane and the two points of contact of the upper passive counter-electrodes on the current bridge with one of the grid wires which is to be welded, form a rigid triangle. With this construction, when the points of weld lie very closely adjacent, that is when the grid has a very small mutual wire-spacing, the current bridge cannot align itself freely so that when the wire diameter varies the same welding pressure is not always applied at both points of weld, as this would require sideways shifting of the pivot point of the current bridge on the ram.

Similar conditions exist in the case of the current bridge arrangement disclosed in Austrian Pat. No. 298.204, in which each current bridge is pivotally connected adjacent to its ends to spring-loaded pressure rods, each of which carries near one end an abutment which cooperates in a self centreing manner with a seating serving as a counter-abutment, whilst the other end of each pressure rod is guided longitudinally with radial clearance. In the case of double point welding of wires of unequal thickness the current bridge positions itself obliquely and the consequence is unequally distributed welding pressures and therefore also non-uniform welds.

The object of the invention is to solve the problem of ensuring, whenever the wire diameter fluctuates, and independently of the double point welding interval, equal electrode pressures and thereby uniform welds.

In accordance with the invention, in a current bridge arrangement of a machine of the kind described, a pressure beam is provided which supports the current bridge and end portions of which project substantially into the welding plane and are guided to slide relatively to guides running normally to the welding plane and to tilt in the plane of the beam. Two pressure members are pivotally connected at one end to the end portions adjacent to the welding plane. The other ends of the pressure members are pivotally connected to the ends of a second beam which is pivotally supported at its centre and extends parallel to the line joining the pivotal connections between the ends of the pressure members and the end portions of the pressure beam.

With this construction, the pressure beam carrying the current bridge with the passive counter-electrodes, the two pressure members pivotally connected to the end portions of the pressure beam, and the second beam which is pivotally connected to the pressure members, form together a quadrilateral linkage (or four bar chain) which enables free adjustment of the pressure beam and thereby of the current bridge, with respect to the welding plane, in such a way that the welding pressures acting via the two passive counter-electrodes are automatically equalized with one another.

In one construction, fluid-operated, i.e. hydraulically or pneumatically actuable, rams are provided as the pressure members and the second beam is supported at its centre by a non-displaceable pivot.

In another construction, thrust rods are provided as the pressing members, and the second beam is pivotally supported at its centre by means which is displaceable in the direction normal to the welding plane by means of a ram.

Figure 2:
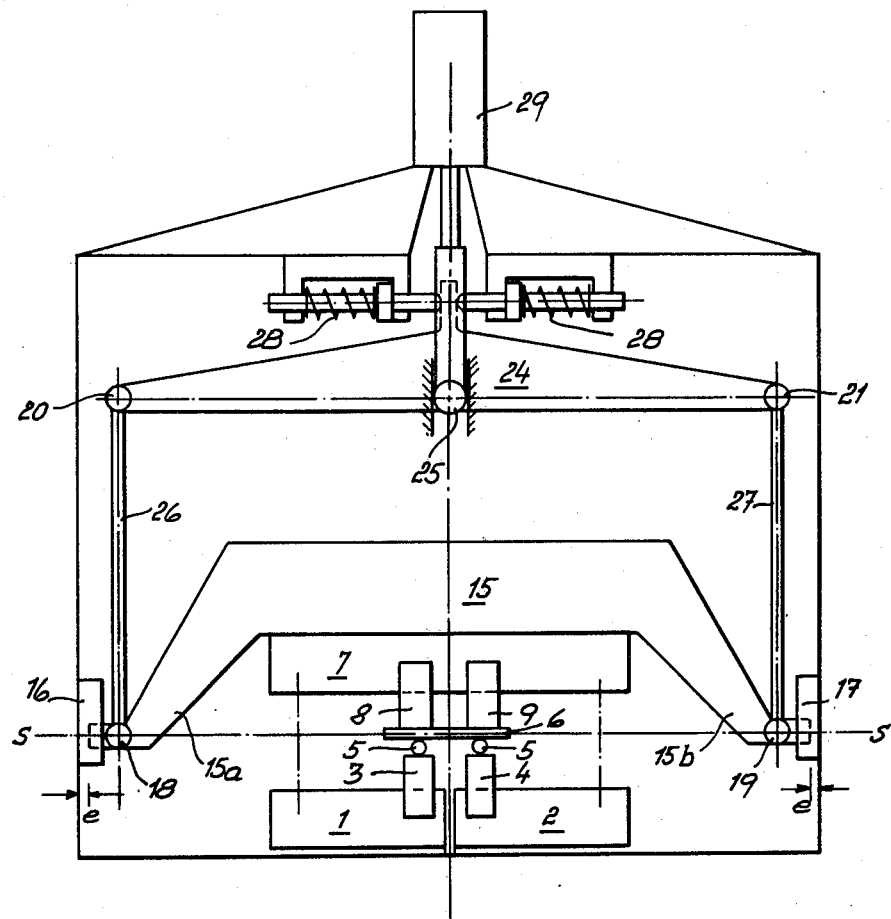

These two alternative constructions are illustrated in FIGS. 1 and 2 respectively of the accompanying drawings in which each Figure is a diagrammatic elevation.

The machine shown in FIG. 1 has two bus-bars 1 and 2 which extend in the direction of the double spot welding interval and are separated from one another electrically by insulation which is not shown. On these bus bars two active electrodes 3, 4 are respectively arranged so as to be able to be adjusted and fixed. Across the welding plane S, i.e. the plane of production of a grid, defined by two longitudinal rods 5 and a cross rod 6, there is a current bridge 7, which has the form of a bus bar along which passive counter-electrodes 8 and 9 are arranged so as to be able to be adjusted and fixed.

The active electrodes 3 and 4 may be adjusted along the respective bus bars 1 and 2 and insulated from one another, to correspond with a desired spacing of the longitudinal wires. The passive counter-electrodes 8 and 9 are adjusted along the common bus bar or current bridge 7 in such a way that they lie each opposite an active electrode. When there is only a small spacing or interval between the longitudinal wires, that is a small mutual spacing of the electrodes, previous current bridge arrangements have had the deficiency already explained, that the welding pressures, which are transferred from the current bridge via the two counter-electrodes, are in general of unequal magnitude because of the lack of adjustability of the current bridge.

However, in the illustrated construction, the current bridge 7 is arranged on a pressure beam 15, ends 15a and 15b of which project obliquely downwards as far as welding the plane S and are guided so as to slide in guides 16, 17 running normally to this plane.

As may be seen from FIG. 1, between the outer vertical boundary of the guides 16, 17, and the ends of the beam parallel with this boundary, there is a gap e so that tilting of the beam 15 in the plane of the beam is possible.

At the level of the welding plane S the bottom ends 18, 19 of two pressure members 26, 27 are pivotally connected to the ends 15a, 15b of the beam 15. Guide rollers may advantageously be provided at these points for rolling against the front and rear walls of the guides 16, 17 so that the beam 15 is always centred exactly with respect to the central plane of the machine. The top ends 20, 21 of the pressure members 26, 27 are pivotally connected to the ends of a second beam 24. The axis of the second beam 24 runs in parallel with the line joining the pivotal connections 18, 19 of the pressure members 26, 27 to the pressure beam 15 and thereby also in parallel with the welding plane S. The beam 24 is supported in a pivot 25 which, in the FIG. 1 example, is fixed. Hydraulically or pneumatically actuable rams are provided as the pressure members 26, 27 for producing the welding pressure.

In order to hold the whole welding mechanism in a predetermined position in the state of rest, adjustable return springs 28 may also be provided.

In the FIG. 2 example the pressure members 26, 27 are constructed as simple thrust rods, in which case the pivot 25 is displaceable in the direction of the plane of symmetry of the machine. For moving this pivot, a ram 29, fixed at one end rigidly into the machine frame is provided. The piston rod of the ram engages the pivot 25 which is guided in parallel with the central plane of the machine.

We claim:

1. In a double point welding machine with a current bridge arrangement having, on one side of a welding plane, at least one pair of active electrodes which are spaced from one another to provide the double point welding interval and are adapted to be connected to a secondary side of a welding transformer; a current bridge carrying passive counter-electrodes for operative association with said active electrodes whereby welding pressure may be applied to a workpiece in said welding plane between said active electrodes and said passive counter-electrodes; and means pivotally mounting said current bridge; an improved current bridge arrangement comprising a pressure beam supporting said current bridge; end portions of said pressure beam projecting substantially into said welding plane; guides running normally to said welding plane and cooperating with said pressure beam end portions for relative sliding thereof and tilting thereof in the plane of said pressure beam; two pressure members each having first and second ends; means pivotally connecting said first end of each of said pressure members to a respective one of said pressure beam end portions adjacent to said welding plane; a second beam extending substantially parallel with the line joining said pivotal connections between said pressure member first ends and said pressure beam end portions, and having first and second ends; means pivotally supporting said second beam at the centre thereof; and means pivotally connecting said second end of each of said pressure members to a respective one of said first and second ends of said second beam.

2. A machine according to claim 1, wherein said pressure members are provided by fluid operated rams, and said means pivotally supporting said second beam provides a non-displaceable pivot for said second beam.

3. A machine according to claim 1, wherein said pressure members are provided by thrust rods, and said means pivotally supporting said second beam is displaceable normally to said welding plane and a ram is provided for displacing said supporting means.

4. A machine according to claim 1, further comprising bus bars for said active electrodes and extending in the direction of said point welding interval, said active electrodes being adapted to be adjusted along and fixed relatively to said bus bars to adjust said point welding interval; and a further bus bar forming said current bridge and extending in said point welding interval direction, said passive counter-electrodes being adapted to be adjusted along and fixed relatively to said further bus bar for operative association with said active electrodes.

* * * * *